(12) United States Patent
Chakraborty et al.

(10) Patent No.: US 11,688,049 B2
(45) Date of Patent: Jun. 27, 2023

(54) SYSTEMS AND METHODS FOR IMAGE PROCESSING

(71) Applicant: Walmart Apollo, LLC, Bentonville, AR (US)

(72) Inventors: Souradip Chakraborty, Kolkata (IN); Abhishek Mishra, Bengaluru (IN); Somedip Karmakar, Karnataka (IN)

(73) Assignee: Walmart Apollo, LLC, Bentonville, AR (US)

( * ) Notice: Subject to any disclaimer, the term of this patent is extended or adjusted under 35 U.S.C. 154(b) by 4 days.

(21) Appl. No.: 17/554,770

(22) Filed: Dec. 17, 2021

(65) Prior Publication Data

US 2022/0335591 A1 Oct. 20, 2022

Related U.S. Application Data

(60) Provisional application No. 63/177,336, filed on Apr. 20, 2021.

(51) Int. Cl.
*G06T 7/00* (2017.01)
*G06T 11/00* (2006.01)

(52) U.S. Cl.
CPC ............ *G06T 7/0002* (2013.01); *G06T 11/00* (2013.01); *G06T 2200/24* (2013.01); *G06T 2207/30168* (2013.01)

(58) Field of Classification Search
CPC ... G06T 7/0002; G06T 11/00; G06T 2200/24; G06T 2207/30168
See application file for complete search history.

(56) References Cited

U.S. PATENT DOCUMENTS

| 10,943,278 | B2 | 3/2021 | Benkreira et al. |
| 2014/0033237 | A1* | 1/2014 | Du .................... H04N 21/2743 725/5 |
| 2014/0355881 | A1* | 12/2014 | Bhardwaj .............. G06T 5/003 382/173 |
| 2015/0288874 | A1* | 10/2015 | Sivan .................... H04N 23/80 348/207.11 |
| 2019/0304002 | A1 | 10/2019 | Adoni et al. |
| 2020/0065955 | A1* | 2/2020 | Garlapati ................ G06F 18/28 |

(Continued)

OTHER PUBLICATIONS

Vue.ai, "Automated Image Moderation with A.I. for eCommerce Retail," Downloading Year: 2021, 6 pages.

(Continued)

*Primary Examiner* — Yu Chen
(74) *Attorney, Agent, or Firm* — Morgan, Lewis & Bockius LLP; Manita Rawat (57) ABSTRACT

This application relates to systems and methods for automatically detecting and correcting image quality based on a set of quality standards. In some examples, a plurality of quality parameters of an image are determined based on receiving an image. It is then determined that at least one of the plurality of quality parameters is below a predetermined threshold. The predetermined threshold may be based on a required quality standard for images. In response to determining that the at least one of the plurality of quality parameters is below the predetermined threshold, feature of the image is adjusted such that the at least one of the plurality of quality parameters is at or above the predetermined threshold.

20 Claims, 5 Drawing Sheets

(56) References Cited

U.S. PATENT DOCUMENTS

2021/0125251 A1* 4/2021 D'Souza ............ G06Q 30/0276
2022/0303459 A1* 9/2022 Bastide ................. G06N 20/00
2022/0358537 A1* 11/2022 Shyu ................. G06Q 30/0244

OTHER PUBLICATIONS

Vue.ai, "Automated Product Tagging for Retail," Downloading Year: 2021, 8 pages.
Vue.ai, "Mercado Libre Automates Image Moderation with A.I." Downloading Year: 2021, 14 pages.
Chew-Yean, "Deep Learning Image Segmentation for ECommerce Catalogue Visual Search," Apr. 18, 2018, 7 pages.

* cited by examiner

SYSTEMS AND METHODS FOR IMAGE PROCESSING

CROSS-REFERENCE TO RELATED APPLICATIONS

This application claims priority to U.S. Provisional Patent Application No. 63/177,336, filed on Apr. 20, 2021 and entitled "SYSTEMS AND METHODS IMAGE PROCESSING," which is hereby incorporated by reference in its entirety.

TECHNICAL FIELD

The disclosure relates generally to processing images and, more specifically, to systems and methods for processing images to detect and correct image quality.

BACKGROUND

At least some websites, such as retailer websites (e.g., e-commerce platforms), display items including relevant and sponsored items (e.g., advertisements) to users via a user interface. A website may allow users or suppliers to provide items to sell on the website. The website may provide an interface for the supplier or user to provide specific information regarding the item(s) to be sold. For example, a user may be required to provide a product name, size, technical details, an image, etc. for the item to be sold on the website. A product image may be required to meet some quality standards (e.g., standard rules on B2B websites, background, technical standards, key information requirements, etc.) in order to provide customers with relevant information about the products for purchase on the website in an easy to consume manner. The retailers must then determine whether provided image(s) meets the quality standards. In current solutions, the retailer must manually determine whether the image(s) meets the quality standards before providing it to end customers for viewing and/or purchasing. Manual review of the images is time consuming and suffers from subjective inaccuracies. For example, a retailer website may receive thousands of products for sale uploaded in a day, translating to thousands of images to be reviewed manually. The process can then be time consuming and costly. Additionally, visually inspecting images for quality standards may lead to inaccurate characterization of images as meeting or not meeting quality standards due to human error.

SUMMARY

The embodiments described herein are directed to detecting and improving image quality based on a set of quality standards. The embodiments may determine whether a received image of a product meets the set of quality standards. For example, the set of quality standards may include a required background, technical standards (e.g., resolution, size, format), blurriness, and textual information (e.g., net weight, nutrition, ingredients, customer care information, packaged date, expiry date, shelf life, price, etc.), logos (e.g., vegetarian, non-vegetarian, FSSAI logo). A machine learning model (e.g., algorithm, supervised neural network, unsupervised neural network, deep neural network, convolutional neural network) may be trained to detect and correct images so as to generate quality images that may be used as a product image on a retail website. The machine learning model may use correction algorithms to correct lower quality images such that the outputted image meets the set of quality standards. For images where such correction is not possible, the machine learning model may indicate to the user that the image is unusable.

In accordance with various embodiments, exemplary systems may be implemented in any suitable hardware or hardware and software, such as in any suitable computing device. For example, in some embodiments, a computing device is configured to receive an image. The computing device may be further configured to determine a plurality of quality parameters of the image. Also, the computing device may be configured to determine that at least one of the plurality of quality parameters is below a predetermined threshold. Further, the computing device may be configured to adjust a feature of the image such that the at least one of the plurality of quality parameters is at or above the predetermined threshold. The adjustment is performed based on the determination that the at least one of the plurality of quality parameters is below the predetermined threshold.

In some embodiments, a method is provided that includes receiving an image. The method further include determining a plurality of quality parameters of the image. Also, the method may include determining that at least one of the plurality of quality parameters is below a predetermined threshold. Further, the method may also include adjusting a feature of the image such that the at least one of the plurality of quality parameters is at or above the predetermined threshold. The adjustment may be performed based on the determination that the at least one of the plurality of quality parameters is below the predetermined threshold.

In yet other embodiments, a non-transitory computer readable medium has instructions stored thereon, where the instructions, when executed by at least one processor, cause a computing device to perform operations that include receiving an image. The instructions, when executed by the at least one processor further cause the computing device to perform operations that include determining a plurality of quality parameters of the image. Also, the instructions, when executed by the at least one processor cause the computing device to perform operations that include determining that at least one of the plurality of quality parameters is below a predetermined threshold. Further, the instructions, when executed by the at least one processor also cause the computing device to perform operations that include adjusting a feature of the image such that the at least one of the plurality of quality parameters is at or above the predetermined threshold. The adjustment is performed based on the determination that the at least one of the plurality of quality parameters is below the predetermined threshold.

BRIEF DESCRIPTION OF THE DRAWINGS

The features and advantages of the present disclosures will be more fully disclosed in, or rendered obvious by the following detailed descriptions of example embodiments. The detailed descriptions of the example embodiments are to be considered together with the accompanying drawings wherein like numbers refer to like parts and further wherein.

DETAILED DESCRIPTION

The description of the preferred embodiments is intended to be read in connection with the accompanying drawings, which are to be considered part of the entire written description of these disclosures. While the present disclosure is susceptible to various modifications and alternative forms, specific embodiments are shown by way of example in the drawings and will be described in detail herein. The objectives and advantages of the claimed subject matter will become more apparent from the following detailed description of these exemplary embodiments in connection with the accompanying drawings.

It should be understood, however, that the present disclosure is not intended to be limited to the particular forms disclosed. Rather, the present disclosure covers all modifications, equivalents, and alternatives that fall within the spirit and scope of these exemplary embodiments. The terms "couple," "coupled," "operatively coupled," "operatively connected," and the like should be broadly understood to refer to connecting devices or components together either mechanically, electrically, wired, wirelessly, or otherwise, such that the connection allows the pertinent devices or components to operate (e.g., communicate) with each other as intended by virtue of that relationship.

Figure 1:
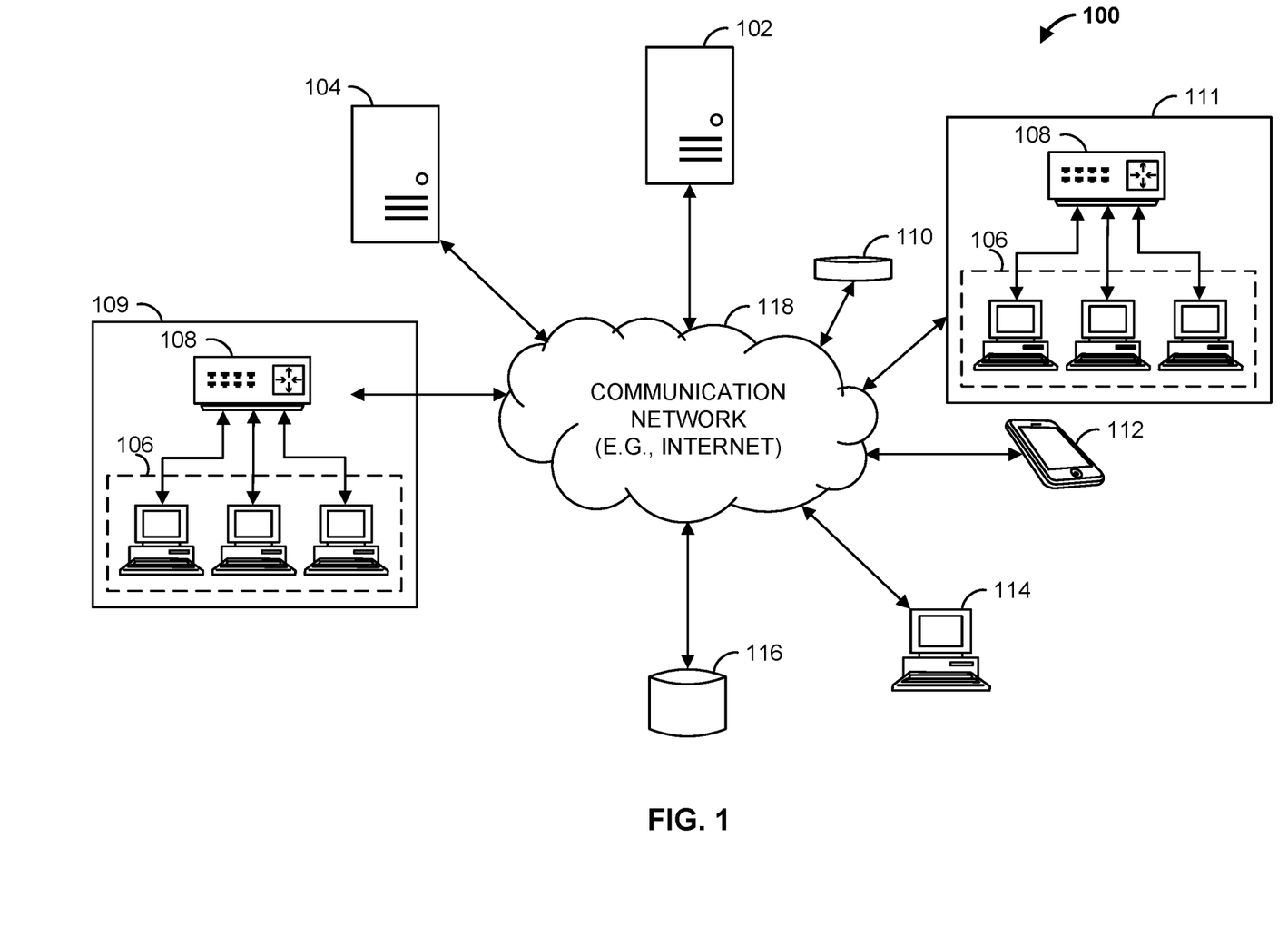
FIG. 1 is a block diagram of an image processing system in accordance with some embodiments.

Turning to the drawings, FIG. 1 illustrates a block diagram of a model system 100 that includes a quality assurance computing device 102 (e.g., a server, such as an application server), a web server 104, workstation(s) 106, database 116, and multiple customer computing devices 110, 112, 114 operatively coupled over network 118. Quality assurance computing device 102, workstation(s) 106, server 104, and multiple customer computing devices 110, 112, 114 can each be any suitable computing device that includes any hardware or hardware and software combination for processing and handling information. For example, each can include one or more processors, one or more field-programmable gate arrays (FPGAs), one or more application-specific integrated circuits (ASICs), one or more state machines, digital circuitry, or any other suitable circuitry. In addition, each can transmit data to, and receive data from, communication network 118.

In some examples, quality assurance computing device 102 can be a computer, a workstation, a laptop, a server such as a cloud-based server, or any other suitable device. In some examples, each of multiple customer computing devices 110, 112, 114 can be a cellular phone, a smart phone, a tablet, a personal assistant device, a voice assistant device, a digital assistant, a laptop, a computer, or any other suitable device. In some examples, quality assurance computing device 102 is operated by an entity training and deploying the models (e.g., machine learning models, algorithms, software stack) including multiple components at multiple layers, and multiple customer computing devices 112, 114 are operated by customers (e.g., users, retailers, end users) of the entity.

Although FIG. 1 illustrates three customer computing devices 110, 112, 114, image processing system 100 can include any number of customer computing devices 110, 112, 114. Similarly, image processing system 100 can include any number of workstation(s) 106, quality assurance computing devices 102, servers 104, and databases 116.

Workstation(s) 106 are operably coupled to communication network 118 via router (or switch) 108. Workstation(s) 106 and/or router 108 may be located at a store 109, for example. Workstation(s) 106 can communicate with quality assurance computing device 102 over communication network 118. The workstation(s) 106 may send data to, and receive data from, quality assurance computing device 102. For example, the workstation(s) 106 may transmit data related to product data (e.g., product images, product information, product name, product technical details, etc.) to quality assurance computing device 102. In response, quality assurance computing device 102 may transmit an indication of one or more updated images of the product and/or one or more quality metrics related to the product image to the workstation(s) 106 in real-time.

In some examples, web server 104 may host one or more web pages, such as a retailer's or merchant's website. Web server 104 may transmit data related to product data on the page as provided by a user (e.g., customer, supplier, manufacturer, etc.) to quality assurance computing device 102. In response, quality assurance computing device 102 may transmit an indication of quality metrics and/or updated image(s) to display on the website or web page to the user. For example, the quality metric of the image may be displayed on the webpage, as a table, as a singular message (e.g., good image, unusable image, bad image, please upload another image), and/or as a request to upload another image. In some examples, an updated image may be shown on the homepage of the webpage as an alternate to the provided image. The updated image may be an image that passes a set of quality standards. The updated image may be an improved image outputted by a machine learning model trained to detect and correct images based on a set of quality standards based on user provided images.

First customer computing device 110, second customer computing device 112, and $N^{th}$ customer computing device 114 may communicate with web server 104 over communication network 118. For example, each of multiple computing devices 110, 112, 114 may be operable to view, access, and interact with webpages of a website hosted by web server 104. In some examples, web server 104 hosts a website for a retailer or merchant that allows users (e.g., customers, suppliers) to provide products (e.g., items) for sale to other customers of the retailer. For example, the website may include an interface for a user to provide product data (e.g., product images, product information, product name, product site) to list the product for sale on the website. An operator of one of multiple computing devices 110, 112, 114 may access the website hosted by web server 104, add or change one or more parameters of the product data, and list products on the website for sale.

Quality assurance computing device 102 is operable to communicate with database 116 over communication network 118. For example, quality assurance computing device 102 can store data to, and read data from, database 116. Database 116 can be a remote storage device, such as a cloud-based server, a memory device on another application server, a networked computer, or any other suitable remote storage. Although shown remote to quality assurance computing device 102, in some examples, database 116 can be a local storage device, such as a hard drive, a non-volatile memory, or a USB stick.

Communication network 118 can be a WiFi® network, a cellular network such as a 3GPP® network, a Bluetooth® network, a satellite network, a wireless local area network (LAN), a network utilizing radio-frequency (RF) communication protocols, a Near Field Communication (NFC) network, a wireless Metropolitan Area Network (MAN) connecting multiple wireless LANs, a wide area network (WAN), or any other suitable network. Communication network 118 can provide access to, for example, the Internet.

Quality assurance computing device 102 can detect and correct a low quality image of product in response to receiving a product image for listing a corresponding product for sale on a website. For example, quality assurance computing device 102 may receive a listing request form a user for listing a product on a webpage. The listing request may include product data including at least a product image to be presented on the product listing on the website. Quality assurance computing device 102 may receive or obtain from database 116 a set of quality standards for images uploaded on the website. The set of quality standards may include one or more of background (e.g., white, light, dark, black), technical standards (e.g., blur, size, resolution, format), blurriness, key information requirements (e.g., net weight, nutrition, ingredients, customer care information, packaged date, expiry date, shelf life, price, etc.), and required logos (e.g., vegetarian, non-vegetarian, FSSAI logo).

Quality assurance computing device 102 may determine quality parameters of the image. In some examples, one or more machine learning models (e.g., neural network, convolutional neural network, deep neural network, machine learning model, algorithm, software stack, software component, etc.) may be used by the quality assurance computing device 102 to determine the parameters of the image. The quality parameters may include actual size, actual resolutions, actual background, actual blurriness, presence and visibility of a logo(s), presence and visibility of key product information, etc. Quality assurance computing device 102 may compare the quality parameters of the received image to the set of quality standards. In some examples, the set of quality standards may include thresholds for each standard. For example, the set of quality standards may include a threshold of 72 ppi resolution, a threshold of 1500 size, a threshold of white background, a threshold for blur, a binary threshold for presence of each key information requirement, etc. It may be determined that at least one quality parameter is below its corresponding quality standard threshold.

For the quality parameter(s) that is below its corresponding required quality standard threshold, quality assurance computing device 102 may attempt to update the image to meet the threshold. For example, a grab-cut algorithm may be used to detect and correct the background of the image. In some examples, background of the received image may be determined by segmenting the image into foreground and background. A rectangular segmentation may be used to fit a rectangle to a foreground. A Gaussian Mixture Model (GMM) may be used to model the foreground and background. Pixels of the image may be assigned to foreground and background. A graph may then be built from the pixel distribution. A mincut algorithm may be used to segment the graph into the foreground and background. In some examples, the process may be iterated till a convergence is observed between the mincut and the graph. The background pixels may be replaced with pixels corresponding to the quality standard for background. In some examples, a segmentation mask may be used to determine the foreground pixels prior to replacing the background pixels (remaining pixels) with quality standard pixels. In some examples, quality assurance computing device 102 may determine that the background pixels cannot be changed to required color in the set of quality standards. In such examples, quality assurance computing device 102 may determine that the image is unusable and/or of poor quality and cannot be used for the product listing. In some examples, quality assurance computing device 102 may cause the user interface to ask the user to provide another image for the listing.

In some examples, resolution of the original image may be below a predetermined threshold. In such examples, quality assurance computing device 102 may apply image transformation algorithms to increase the resolution of the image so that it meets the corresponding resolution threshold of the set of quality standards. Similarly, size of image may be below or above size thresholds in the set of quality standards. In such examples, quality assurance computing device 102 may apply a transformation algorithm to transform the image to an acceptable size. It should be understood that transforming the image may lead to distortion and/or blurriness. In such examples, quality assurance computing device 102 may apply algorithms to balance between clarity of the image and the size and/or resolution requirements. If both cannot be met, quality assurance computing device 102 may determine that the image cannot be fixed and as such, may not be used for the product listing.

Similarly, if the original image is in a format unacceptable under the set of quality standards, quality assurance computing device 102 may change the format to an acceptable format. If such format change is not possible without compromising other quality parameters of the image to an unacceptable degree, quality assurance computing device 102 may determine that the image is unusable or unacceptable. In some examples, quality assurance computing device 102 may further indicate to the user that the format is not acceptable and/or request another image in an acceptable format.

In some examples, the received image may be imputed into an image classifier network to generate a quality score for the image. BRISQUE image scoring may be used to score the image. If the quality score of the image is lower than a predetermined threshold, the image may be sent to a correction algorithm for image correction based on the set of quality standards. For example, a blurry image that is blurred above a predetermined threshold, the image may be fed into a deep variational autoencoder network for image enhancement in order to attempt to enhance the image to reduce blur. In some examples, a variance of Laplacian algorithm may be used to generate a single floating point value to represent the blurriness of the image. The image may be convolved with the Laplacian operator to compute the variance. The updated image may include the image corrected for blurriness. In some examples, if quality assurance computing device 102 is unable to reduce the blur in the image below the predetermined threshold in the set of quality standards, quality assurance computing device 102 may determine that the image is unusable and/or of poor quality and cannot be used for the product listing. In some examples, quality assurance computing device 102 may cause the user interface to ask the user to provide another image for the listing.

In some examples, quality assurance computing device 102 may determine whether a logo is present or visible in the image using a template matching algorithm. Normalized cross-correlation may further be used to find a match for a quality standard logo in the image. Each logo in the set of quality standards may be attempted to be matched to portions of the image based on template matching algorithm. If a required logo is not present in the input image, quality assurance computing device 102 may predict that the image is unusable and/or of poor quality and cannot be used for the product listing. In some examples, quality assurance computing device 102 may cause the user interface to ask the user to provide another image for the listing.

Further, in some examples, quality assurance computing device 102 may utilize a text extraction and information retrieval algorithm to predict presence of key information in the image. For example, net weight, expiry date, manufacture date, shelf life, etc. may be extracted from the user provided image using any known text extraction technique. If the required key information is not detected or extractable, quality assurance computing device 102 may determine that the image is unusable and/or of poor quality and cannot be used for the product listing. In some examples, quality assurance computing device 102 may cause the user interface to ask the user to provide another image for the listing.

It should be understood that the detection and correction algorithms corresponding to each quality standard in the set of quality standards may be performed in parallel. In examples, a machine learning model(s) may be trained to predict and correct poor quality images. In such examples, each layer of the machine learning model(s) may correspond to a different quality standard to test for of the set of quality standards. The output of the machine learning model(s) may include one of an updated image that meets the quality standards, an indication that the input image is unusable, and an indication that the input image is of good quality. The machine learning model(s) and/or each layer of the machine learning model(s) may be trained with labeled training images and curated loss functions.

The original image and/or the updated image that meets the set of quality standards may be uploaded to a corresponding product listing. Quality assurance computing device 102 may further allow a user to upload another or alternate image when the input image is of poor quality and cannot be updated to meet the standards. In such examples, quality assurance computing device 102 may receive another image that may undergo the same process to assure that the image is and/or could be made to be of good quality that meets the set of quality standards.

Figure 2:
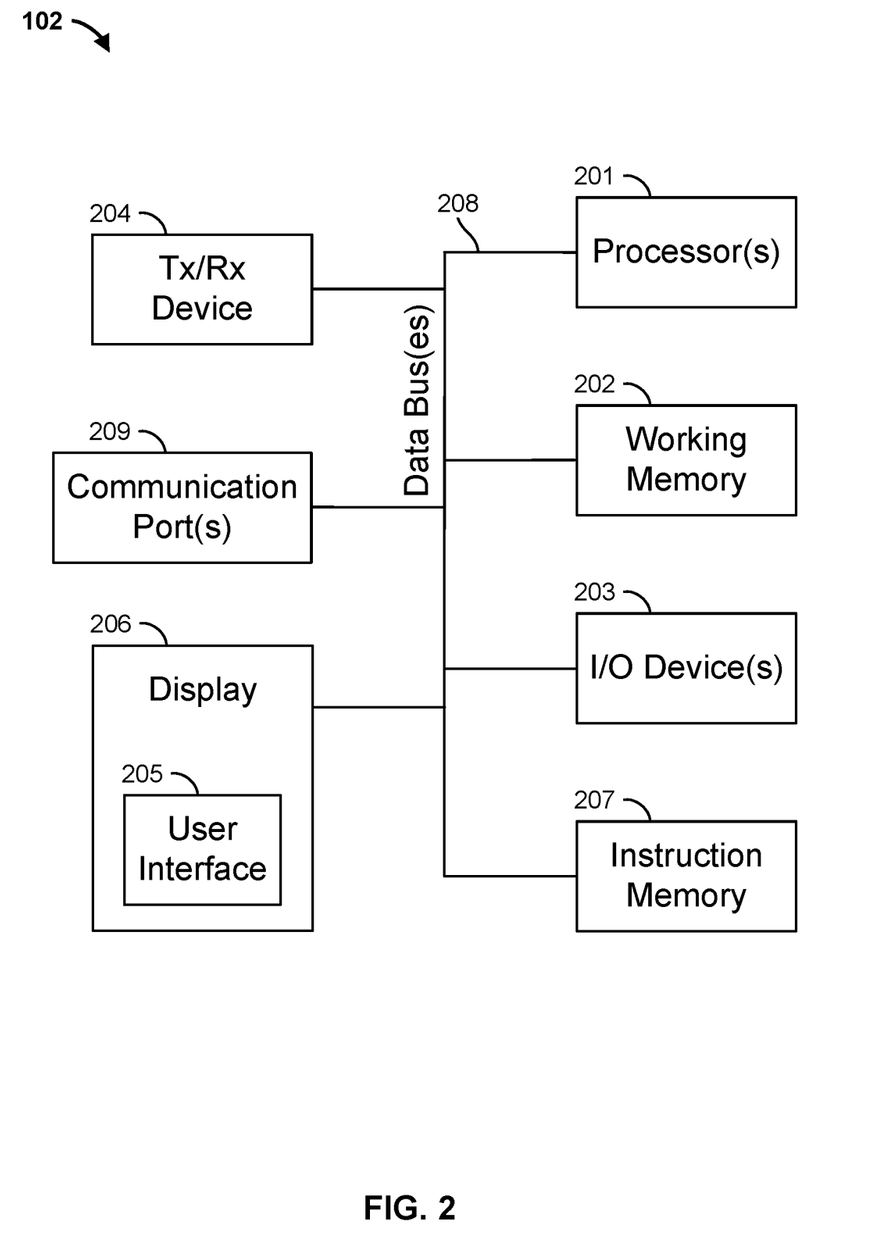
FIG. 2 is a block diagram of quality assurance computing device of image processing system of FIG. 1 in accordance with some embodiments.

FIG. 2 illustrates the quality assurance computing device 102 of FIG. 1. Quality assurance computing device 102 can include one or more processors 201, working memory 202, one or more input/output devices 203, instruction memory 207, a transceiver 204, one or more communication ports 209, and a display 206, all operatively coupled to one or more data buses 208. Data buses 208 allow for communication among the various devices. Data buses 208 can include wired, or wireless, communication channels.

Processors 201 can include one or more distinct processors, each having one or more cores. Each of the distinct processors can have the same or different structure. Processors 201 can include one or more central processing units (CPUs), one or more graphics processing units (GPUs), application specific integrated circuits (ASICs), digital signal processors (DSPs), and the like.

Processors 201 can be configured to perform a certain function or operation by executing code, stored on instruction memory 207, embodying the function or operation. For example, processors 201 can be configured to perform one or more of any function, method, or operation disclosed herein.

Instruction memory 207 can store instructions that can be accessed (e.g., read) and executed by processors 201. For example, instruction memory 207 can be a non-transitory, computer-readable storage medium such as a read-only memory (ROM), an electrically erasable programmable read-only memory (EEPROM), flash memory, a removable disk, CD-ROM, any non-volatile memory, or any other suitable memory.

Processors 201 can store data to, and read data from, working memory 202. For example, processors 201 can store a working set of instructions to working memory 202, such as instructions loaded from instruction memory 207. Processors 201 can also use working memory 202 to store dynamic data created during the operation of quality assurance computing device 102. Working memory 202 can be a random access memory (RAM) such as a static random access memory (SRAM) or dynamic random access memory (DRAM), or any other suitable memory.

Input-output devices 203 can include any suitable device that allows for data input or output. For example, input-output devices 203 can include one or more of a keyboard, a touchpad, a mouse, a stylus, a touchscreen, a physical button, a speaker, a microphone, or any other suitable input or output device.

Communication port(s) 209 can include, for example, a serial port such as a universal asynchronous receiver/transmitter (UART) connection, a Universal Serial Bus (USB) connection, or any other suitable communication port or connection. In some examples, communication port(s) 209 allows for the programming of executable instructions in instruction memory 207. In some examples, communication port(s) 209 allow for the transfer (e.g., uploading or downloading) of data, such as machine learning algorithm training data.

Display 206 can display user interface 205. User interfaces 205 can enable user interaction with quality assurance computing device 102. For example, user interface 205 can be a user interface for an application of a retailer that allows a customer to view and interact with a retailer's webpage. In some examples, a user can interact with user interface 205 by engaging input-output devices 203. In some examples, display 206 can be a touchscreen, where user interface 205 is displayed on the touchscreen.

Transceiver 204 allows for communication with a network, such as the communication network 118 of FIG. 1. For example, if communication network 118 of FIG. 1 is a cellular network, transceiver 204 is configured to allow communications with the cellular network. In some examples, transceiver 204 is selected based on the type of communication network 118 and quality assurance computing device 102 will be operating in. Processor(s) 201 is operable to receive data from, or send data to, a network, such as communication network 118 of FIG. 1, via transceiver 204.

Figure 3:
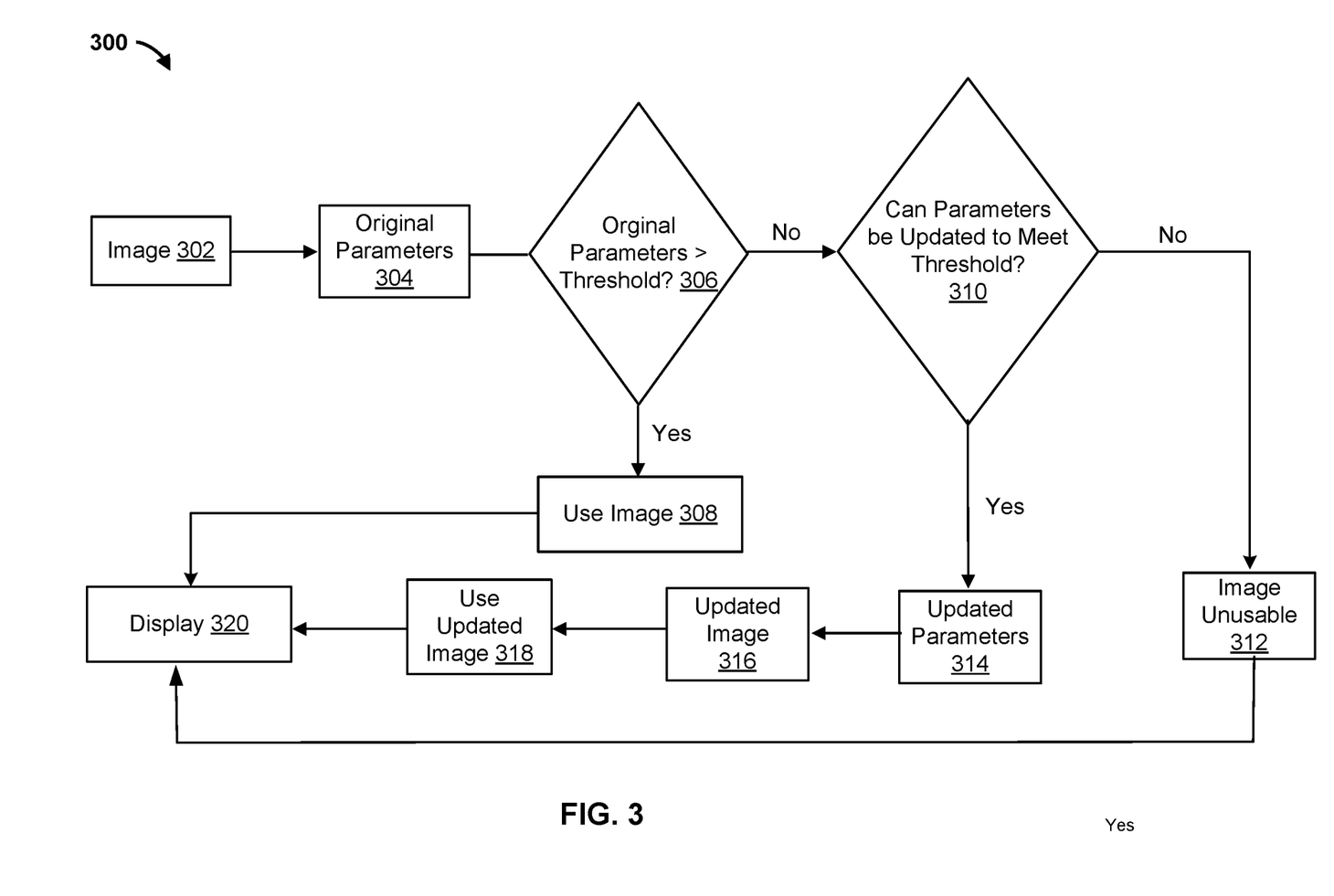
FIG. 3 is an example process flow illustrating a process of quality assurance computing device of FIG. 1 in accordance with some embodiments.

Turning now to FIG. 3, an example process flow 300 is shown. The process flow 300 illustrates how the image processing system 100 can predict and correct input images to meet quality standards. The process 300 can begin when image 302 is received or obtained by image processing system 100 from a user device. Such image 302 can be received via a communications network, such as network 118. Image 302 may be analyzed to determine original parameters 304 of the image. The original parameters 304 may include actual size, actual resolution, actual format, actual background, actual blur, actual key information, actual logos, etc.

At step 306, actual parameters are compared to thresholds corresponding to a set of quality standards to determine whether each actual parameter meets the corresponding required thresholds of the set of quality standards. If the each original parameter of the original parameters 304 meet the corresponding thresholds, image 302 may be determined used as the designated image in step 308 for display 320 on a user interface for use as the product image for an item.

However, if an original parameter(s) fails to meet the corresponding required threshold(s) of the set of quality standards, at step 310, it is determined whether the original parameter(s) may be updated to meet the corresponding threshold(s). For example, it may be determined whether the background of the image may be changed to the required background color. In another example, it may be determined whether a resolution of the image may be increased to meet the resolution threshold in the set of quality standards. On the other hand, it may be determined that key information is missing and cannot be added to the image.

At step 310, when it is determined that the original parameter(s) of the original parameters 304 cannot be updated to meet the corresponding threshold(s), at step 312, the image may be determined to be unusable and/or of poor quality. An indication of the image being unusable or poor quality may be displayed at step 320. In some examples, display 320 when the image is unusable at step 312 may include an indication of requesting another or an alternate image from the user.

At step 310, when it is determined that the original parameter(s) of the original parameters 304 can be updated to meet the corresponding threshold(s), the updated parameters 314 may be determined or generated. For example, updated parameters 314 may include updated pixel distribution that is based on the color required in the set of quality parameters. In another example, updated parameters 314 may include a new resolution of the image, and/or a new blur parameters. Updated image 316 may be generated using the updated parameter 314 that meets the set of quality standards. The updated image 316 may be used as the image for the listing in step 318. Updated image 316 may be displayed as step 320 to the user for the product listing on the website. As such, display 320 may include one of the original image 302, an updated image 316, or an indication of the original image 310 being unusable as determined at step 312.

Figure 4:
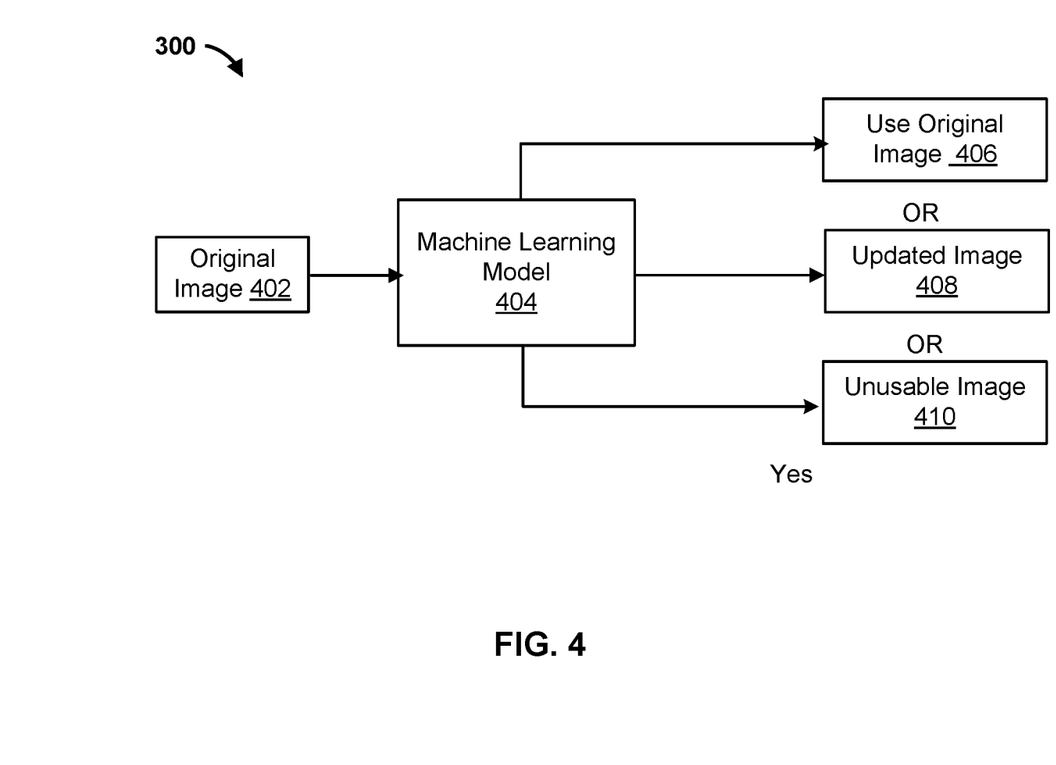
FIG. 4 is an example process flow illustrating a process of quality assurance computing device of FIG. 1 in accordance with some embodiments.

Referring now to FIG. 4, an example process flow 400 is illustrated. An original image 402 is applied to a machine learning model 404 for processing. The machine learning model 404 may be trained to detect and correct images such that images comply with a set of quality standards. Machine learning model 404 may be one or more of a neural network, a convolutional neural network, a deep neural network, a machine learning model, an algorithm, a software stack, a software component, etc. In some examples, machine learning model 404 may include a plurality of layers, each trained to detect and/or correct a quality parameter of images corresponding to a quality standard of the set of quality standards. The output of each layer may then be combined to determine whether the image meets the quality standards, an updated image that meets the quality standards or the image is unusable.

In some examples, machine learning model 404 may first determine the original parameters of the original image 402. Machine learning model 404 may then determine whether one or more of the original parameters is subpar when compared to the corresponding required quality standards. For each original parameter that does not meet the corresponding quality standard, machine learning model 404 may attempt to correct the parameter so as to meet the corresponding quality standard. In some examples, the original image may be applied to each layer of the machine learning model 404 for correction. In other examples, the original image 402 may only be provided to layers corresponding to the quality standards that are not met by the original image 404. In some examples, the original image 404 may be sent through each layer simultaneously. In other examples, the original image 404 may be applied to each layer one after the other in a sequential manner.

When machine learning model 404 determines that the original image meets each of the quality standards of the set of quality standards, machine learning model 404 may be configured to provide an indication that the original image is to be used for a product listing at step 406. If the machine learning model 404 determines instead that the original image is unusable and cannot be corrected to meet at least one quality standard of the set of quality standards, the machine learning model may be configured to provide an indication that the original image is unusable at step 410.

Further, when machine learning model 404 determines that the original image 402 may be updated such that it meet each and every quality standard of the set of quality standards, machine learning model 404 may be configured to generate an updated image 408 with updated parameters that meet each quality standard of the set of quality standards. Machine learning model 404 may use different algorithms corresponding to different quality standard to correct the parameters that are subpar in the original image. In some examples, the updated image 408 may be presented to the user to request whether the user is willing to use the updated image instead of the original image. The updated image 408 may be used as the product image for the product listing on the retailer website. In this way, quality assurance computing device 102 may automatically determine whether an image meets quality standards to clearly present the product data to the users and automatically corrects parameters of the image that do initially meet the Quality standards. As such, quality assurance computing device 102 improves customer experience at the retailer website while decreasing costs and time associated with manual quality assurance of images. It also provides a consistent way to assuring quality of images uploaded on a retailer website by removing subjective bias associated with manual inspection.

Figure 5:
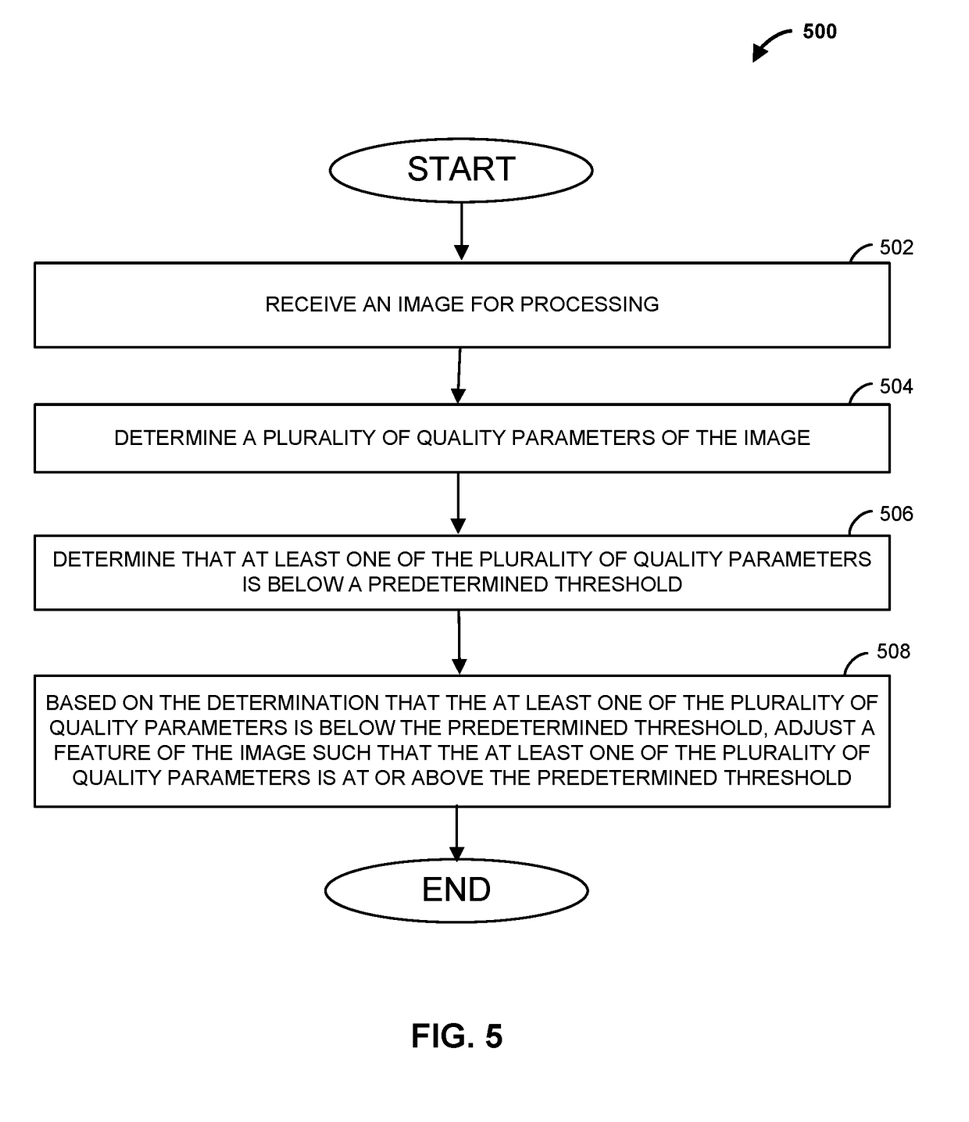
FIG. 5 is a flowchart of an example method that can be carried out by the image processing system of FIG. 1 in accordance with some embodiments.

Referring now to FIG. 5, an example method 500 for image quality assurance is illustrated. The method begins at step 502 when the image processing system 100 receives an image for processing. For example, quality assurance computing device 102 may receive an image 302 for processing.

The quality assurance computing device 102 may determine a plurality of quality parameters of the image, at step 504. For example, original parameters 304 of the image 302 may be determined. At step 506, it is determined that at least one of the plurality of quality parameters is below a predetermined threshold. For example, it is determined at step 306 whether the original parameters 304 are below a predetermined threshold.

At step 508, based on the determination that the at least one of the plurality of quality parameters is below the predetermined threshold, the quality assurance computing device 102 may adjust a feature of the image such that the at least one of the plurality of quality parameters is at or above the predetermined threshold. For example, updated parameters 314 may be determined by adjusting a feature or parameter of the original parameters 304 such that the corresponding original parameter is at or above the predetermined threshold. Updated parameters 314 are determined based on the determination that the at least one original parameter 304 is below a corresponding threshold. The method then ends.

Although the methods described above are with reference to the illustrated flowcharts, it will be appreciated that many other ways of performing the acts associated with the methods can be used. For example, the order of some operations may be changed, and some of the operations described may be optional.

In addition, the methods and system described herein can be at least partially embodied in the form of computer-implemented processes and apparatus for practicing those processes. The disclosed methods may also be at least partially embodied in the form of tangible, non-transitory machine-readable storage media encoded with computer program code. For example, the steps of the methods can be embodied in hardware, in executable instructions executed by a processor (e.g., software), or a combination of the two. The media may include, for example, RAMs, ROMs, CD-ROMs, DVD-ROMs, BD-ROMs, hard disk drives, flash memories, or any other non-transitory machine-readable storage medium. When the computer program code is loaded into and executed by a computer, the computer becomes an apparatus for practicing the method. The methods may also be at least partially embodied in the form of a computer into which computer program code is loaded or executed, such that, the computer becomes a special purpose computer for practicing the methods. When implemented on a general-purpose processor, the computer program code segments configure the processor to create specific logic circuits. The methods may alternatively be at least partially embodied in application specific integrated circuits for performing the methods.

The foregoing is provided for purposes of illustrating, explaining, and describing embodiments of these disclosures. Modifications and adaptations to these embodiments will be apparent to those skilled in the art and may be made without departing from the scope or spirit of these disclosures.

What is claimed is:

1. A system comprising:
 a computing device configured to:
  receive an image;
  determine, using a machine learning model including a plurality of layers, a plurality of quality parameters of the image, wherein each layer of the machine learning model is trained to detect a different quality parameter of the plurality of quality parameters;
  compare each parameter of the plurality of quality parameters with a corresponding predetermined threshold of a plurality of predetermined thresholds;
  determine that at least one of the plurality of quality parameters is below the corresponding predetermined threshold; and
  based on the determination that the at least one of the plurality of quality parameters is below the corresponding predetermined threshold, adjust, using the machine learning model, a feature of the image such that the at least one of the plurality of quality parameters is at or above the corresponding predetermined threshold.

2. The system of claim 1, wherein the computing device is further configured to:
 generate an updated image based at least in part on the adjusted feature; and
 present, via a user interface, the updated image.

3. The system of claim 1, wherein the computing device is further configured to:
 receive a second image;
 determine, using the machine learning model, a plurality of second quality parameters of the second image, wherein each layer of the machine learning model is trained to detect, among the plurality of second quality parameters, a different second quality parameter corresponding to a respective predetermined threshold of the plurality of predetermined thresholds;
 determine that each second quality parameter of the plurality of second quality parameters is above the respective corresponding predetermined threshold; and
 based on the determination that each second quality parameter of the plurality of second quality parameters is over the respective corresponding predetermined threshold, determine that the second image is of an acceptable quality.

4. The system of claim 3, wherein the computing device is further configured to:
 display, via a user interface, the second image based on the determination that the second image of the acceptable quality.

5. The system of claim 1, wherein the computing device is further configured to:
 receive a third image;
 determine, using the machine learning model, a plurality of third quality parameters of the third image, wherein each layer of the machine learning model is trained to detect, among the plurality of third quality parameters, a different third quality parameter corresponding to a respective predetermined threshold of the plurality of predetermined thresholds;
 determine that at least one of the plurality of third quality parameters is below the respective corresponding predetermined threshold;
 determine that the at least one of the plurality of third quality parameters is at its maximum quality; and
 based on the determination that the at least one of the plurality of third quality parameters is below the respective corresponding predetermined threshold and at its maximum quality, determine that the third image is of an unacceptable quality.

6. The system of claim 5, wherein the computing device is further configured to:
 present, via a user interface, a notification indicating the unacceptable quality of the third image.

7. The system of claim 1, wherein the plurality of quality parameters of the image include one or more of background parameters, technical parameters, key information parameters and logos parameters.

8. The system of claim 7, wherein the technical parameters include one or more of a blur, a size, a resolution and a format.

9. A method comprising:
 receiving an image;
 determining, using a machine learning model including a plurality of layers, a plurality of quality parameters of the image, wherein each layer of the machine learning model is trained to detect a different quality parameter of the plurality of quality parameters;
 comparing each parameter of the plurality of quality parameters with a corresponding predetermined threshold of a plurality of predetermined thresholds;
 determining that at least one of the plurality of quality parameters is below the corresponding predetermined threshold; and
 based on the determining that the at least one of the plurality of quality parameters is below the corresponding predetermined threshold, adjusting, using the machine learning model, a feature of the image such that the at least one of the plurality of quality parameters is at or above the corresponding predetermined threshold.

10. The method of claim 9, the method further comprising:
   generating an updated image based at least in part on the adjusted feature; and
   presenting, via a user interface, the updated image.

11. The method of claim 9, the method further comprising:
   receiving a second image;
   determining, using the machine learning model, a plurality of second quality parameters of the second image, wherein each layer of the machine learning model is trained to detect, among the plurality of second quality parameters, a different second quality parameter corresponding to a respective predetermined threshold of the plurality of predetermined thresholds;
   determining that each second quality parameter of the plurality of second quality parameters is above the respective corresponding predetermined threshold; and
   based on determining that each second quality parameter of the plurality of second quality parameters is over the respective corresponding predetermined threshold, determining that the second image is of an acceptable quality.

12. The method of claim 11, the method further comprising:
   displaying, via a user interface, the second image based on determining that the second image is of the acceptable quality.

13. The method of claim 9, the method further comprising:
   receiving a third image;
   determining using the machine learning model, a plurality of third quality parameters of the third image, wherein each layer of the machine learning model is trained to detect, among the plurality of third quality parameters, a different third quality parameter corresponding to a respective predetermined threshold of the plurality of predetermined thresholds;
   determining that at least one of the plurality of third quality parameters is below the respective corresponding predetermined threshold;
   determining that the at least one of the plurality of third quality parameters is at its maximum quality; and
   based on determining that the at least one of the plurality of third quality parameters is below the respective corresponding predetermined threshold and at its maximum quality, determining that the third image is of an unacceptable quality.

14. The method of claim 13, the method further comprising:
   presenting, via a user interface, a notification indicating the unacceptable quality of the third image.

15. The method of claim 9, wherein the plurality of quality parameters of the image include one or more of background parameters, technical parameters, key information parameters and logos parameters.

16. The method of claim 15, wherein the technical parameters include one or more of a blur, a size, a resolution and a format.

17. A non-transitory computer readable medium having instructions stored thereon, wherein the instructions, when executed by at least one processor, cause a device to perform operations comprising:
   receiving an image;
   determining, using a machine learning model including a plurality of layers, a plurality of quality parameters of the image, wherein each layer of the machine learning model is trained to detect a different quality parameter of the plurality of quality parameters;
   comparing each parameter of the plurality of quality parameters with a corresponding predetermined threshold of a plurality of predetermined thresholds;
   determining that at least one of the plurality of quality parameters is below the corresponding predetermined threshold; and
   based on the determining that the at least one of the plurality of quality parameters is below the corresponding predetermined threshold, adjusting using the machine learning model, a feature of the image such that the at least one of the plurality of quality parameters is at or above the corresponding predetermined threshold.

18. The non-transitory computer readable medium of claim 17, the operations further comprising:
   receiving a second image;
   determining using the machine learning model, a plurality of second quality parameters of the second image, wherein each layer of the machine learning model is trained to detect, among the plurality of second quality parameters, a different second quality parameter corresponding to a respective predetermined threshold of the plurality of predetermined thresholds;
   determining that each second quality parameter of the plurality of second quality parameters is above the respective corresponding predetermined threshold; and
   based on determining that each second quality parameter of the plurality of second quality parameters is over the respective corresponding predetermined threshold, determining that the second image is of an acceptable quality.

19. The non-transitory computer readable medium of claim 17, the operations further comprising:
   receiving a third image;
   determining using the machine learning model, a plurality of third quality parameters of the third image, wherein each layer of the machine learning model is trained to detect, among the plurality of third quality parameters, a different third quality parameter corresponding to a respective predetermined threshold of the plurality of predetermined thresholds;
   determining that at least one of the plurality of third quality parameters is below the respective corresponding predetermined threshold;
   determining that the at least one of the plurality of third quality parameters is at its maximum quality; and
   based on determining that the at least one of the plurality of third quality parameters is below the respective corresponding predetermined threshold and at its maximum quality, determining that the third image is of an unacceptable quality.

20. The non-transitory computer readable medium of claim 19, the operations further comprising:
   presenting, via a user interface, a notification indicating the unacceptable quality of the third image.

* * * * *